United States Patent [19]
Karl et al.

[11] Patent Number: 4,717,323
[45] Date of Patent: Jan. 5, 1988

[54] DEVICE FOR COOLING A FOIL TUBING

[76] Inventors: Veit-Holger Karl, Habichtweg 12, 8903 Bobingen; Klaus Würtele, Eppaner Strasse 8, 8904 Friedberg, both of Fed. Rep. of Germany

[21] Appl. No.: 857,360

[22] Filed: Apr. 22, 1986

[30] Foreign Application Priority Data

Sep. 7, 1985 [DE] Fed. Rep. of Germany ... 8525622[U]

[51] Int. Cl.$^4$ .............................................. B29C 47/92
[52] U.S. Cl. .................................. 425/72 R; 264/569; 425/326.1; 425/387.1
[58] Field of Search ................... 425/72 R, 327, 326.1, 425/387.1, 397; 264/563, 564, 566, 569

[56] References Cited

U.S. PATENT DOCUMENTS

| | | | |
|---|---|---|---|
| 3,363,035 | 1/1968 | Niiho et al. ................... | 425/397 X |
| 3,663,134 | 5/1972 | Coquelin ........................ | 264/566 X |
| 3,852,392 | 12/1974 | Davis et al. ................... | 425/326.1 X |
| 4,388,061 | 6/1983 | Bebok ........................... | 425/326.1 X |
| 4,408,970 | 10/1983 | Bustin et al. ................. | 425/72 R |
| 4,447,387 | 5/1984 | Blakeslee, III et al. ...... | 425/72 R X |
| 4,473,527 | 9/1984 | Fujisaki et al. ............... | 264/569 X |
| 4,478,564 | 10/1984 | Shinmoto ....................... | 425/72 R |
| 4,624,823 | 11/1986 | Audureau et al. ............. | 425/72 R X |

FOREIGN PATENT DOCUMENTS

| | | | |
|---|---|---|---|
| 127565 | 12/1984 | European Pat. Off. ........ | 425/326.1 |
| 2544611 | 4/1977 | Fed. Rep. of Germany ... | 425/326.1 |
| 130642 | 4/1978 | German Democratic Rep. ... | 425/72 R |
| 2147247 | 5/1985 | United Kingdom ............ | 425/326.1 |

*Primary Examiner*—Richard L. Chiesa
*Attorney, Agent, or Firm*—Pascal & Associates

[57] ABSTRACT

A device for cooling foil tubing as it issues from an annular nozzle surrounded by an annular air outlet orifice. A first cylindrical chamber is connected in the direction of the course of the foil tubing to the air outlet orifice, and has an iris diaphragm at its upper end. The air flowing into the chamber flows out between the inner rim of the diaphragm and the foil tubing. At least one first additional chamber is connected to the first chamber at the other side of the iris diaphragm. The additional chamber has a first additional iris diaphragm at its upper end which has an adjusting mechanism independent of the iris diaphragm at its upper end of the first chamber. The walls of both chambers are constructed of solid material.

8 Claims, 1 Drawing Figure

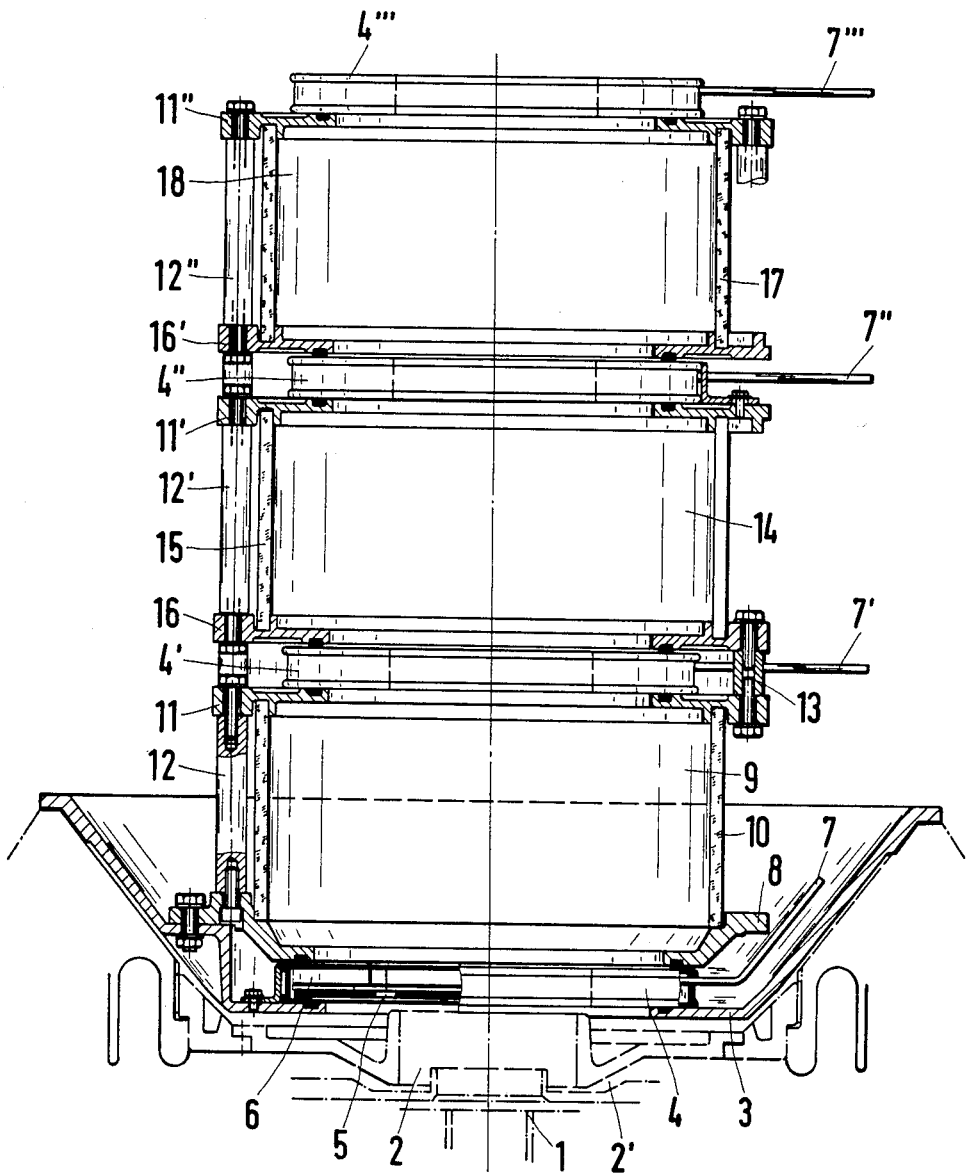

4,717,323

DEVICE FOR COOLING A FOIL TUBING

INTRODUCTION

This invention concerns a device for cooling foil tubing issuing from an annular nozzle in which the nozzle is surrounded by an annular air outlet orifice, to which a cylindrical chamber is connected in the direction of the course of the foil tubing which, on the one hand, is connected with the air outlet orifice, and on the other hand, has an iris diaphragm, the air flowing into the chamber flowing off between the inner rim of the diaphragm and the foil tubing.

A BRIEF DESCRIPTION OF THE PRIOR ART

In a known device of this type, the air outlet orifice opens directly into the chamber, which has an elastic wall. The cooling air issuing from the air outlet orifice flows along the tubing and issues at the iris diaphragm. The air current produces negative pressure inside the chamber. This negative pressure together with the air current outside the foil tubing causes this tubing to expand after leaving the nozzle while diffusing the chamber.

SUMMARY OF THE INVENTION

It is an object of this invention to construct the device in such a way that the diameter of the tubing can be maintained as constant as possible while diffusing the cooling device.

In summary, the invention is a device for cooling foil tubing as its issues from an annular nozzle in which the nozzle is surrounded by an annular air outlet orifice. A first cylindrical chamber is connected in the direction of the course of the foil tubing to the air outlet orifice, and has an iris diaphragm. The air flowing into the chamber flows out between the inner rim of the diaphragm and the foil tubing. At least one first additional chamber is connected to the first chamber at the other side of the iris diaphragm. The additional chamber has a first additional iris diaphragm which has an adjusting mechanism independent of the one iris diaphragm. The walls of both chambers are constructed of solid material.

BRIEF DESCRIPTION OF THE DRAWINGS

An embodiment of the invention is described in greater detail below with reference to the drawing, which shows a vertical section through the device.

DESCRIPTION OF THE PREFERRED EMBODIMENT

The tubing, which is in the plastic state, issues from the nozzle 1. It is cooled on its outer surface by cooling air which flows from the annular air outlet orifice 2' into the chamber 2. An iris diaphram 4 is mounted on a flange 3, which is connected to the chamber 2 and surrounds it. The laminae 5 of this iris diaphragm 4 can be adjusted by means of an adjusting collar 6, arranged with a handle 7, so that the opening of the iris diaphragm 4 can be manually adjusted. The iris diaphragm 4 is located between the flange 3 and an additional flange 8, whereby sealing rings are provided between the flanges 3, 8 and the iris diaphragm 4.

Flange 8 forms the lower closure of a first chamber 9, whose wall 10 is comprised of hard material, preferably acryl glass. A ring flange 11, which is connected with the ring flange 8 by means of spacer pins 12, is mounted onto this cylindrical wall 10. A further iris diaphragm 4', whose construction is identical with the construction of the iris diaphragm 4, is mounted onto flange 11. The diameter of the lamellar opening can be adjusted by means of a handle 7'. The iris diaphragm 4' is arranged between the ring flange 11 and a ring flange 16 which is identical to it, which are connected to one another by means of spacer pins 13. Sealing rings are, in turn, provided between the ring flanges 11, 16 and the iris diaphragm 4'.

Flange 16 forms the lower closure of a second chamber 14, whose cylindrical wall 15 also is comprised of acryl glass. A ring flange 11', which is connected with the ring flange 16 by means of spacer pins 12', is mounted onto this cylindrical wall 15. Flange 11' is identical to the ring flanges 11, 16. A third iris diaphragm 4" is placed between this flange 11' and an additional ring flange 16' which is identical to it. Sealing rings are, in turn, provided between this iris diaphragm 4" and the flanges 11', 16'. The diaphragm aperture of the iris diaphragm 4" is adjustable by means of a handle 7". The two ring flanges 11', 16' are, in turn, connected to one another by means of spacer pins corresponding to the spacer pins 13.

The cylindrical wall 17 of a third chamber 18 is mounted on the ring flange 16', the wall 17 of which, in turn, is comprised of acryl glass. A ring flange 11", which is connected with flange 16' by means of spacer pins 12", is mounted on the wall 17. This flange 11", which is identical to the flanges 11, 16, has a fourth iris diaphragm 4'''. The diaphragm aperture of the latter iris diaphragm can be manually adjusted by means of a handle 7'''.

The inside of the tubing issuing from the nozzle 1 is, moreover, cooled by an internal cooling device of known construction which is not shown.

By regulating the amount of air issuing from the air outlet orifice 2 and by adjusting the diaphragm openings of the iris diaphragms 4, 4', 4" and 4''', it is possible to keep the diameter of the tubing passing through the device constant to a great extent. The flow of the tubing and thus its diameter can be observed by means of the transparent walls 10, 15, 17 of the chambers 9, 14, 18.

As can be seen in the drawing, the chambers 9, 14 and 18 of this embodiment of the invention have the same diameter and the same height. Dependent on the respective operating parameters, however, it can, in some cases, be more advantageous to construct chamber 9 or chambers 9 and 14, at a constant diameter, with a smaller height, for example, half the height as compared to the remaining chambers. Other additional, similarly constructed chambers can be arranged beyond chamber 18.

For example, in an embodiment the volumes of the additional chambers can be about equal. In another embodiment the values of the first additional chamber can be approximately half as large as the volume of the other additional chambers. In a further embodiment the volume of the third additional chamber can be about twice as great as the volume of the other additional chamber.

We claim:

1. A device for cooling foil tubing in the plastic state as it issues from an annular nozzle comprising:
   (a) an annular air outlet orifice which surrounds the nozzle, (b) a first cylindrical chamber connected in the direction of the course of the foil tubing to the air outlet orifice, (c) a first iris diaphragm at the upper end of the first cylindrical chamber, (d) a second cylindrical chamber connected to the first chamber at the other side of the first iris diaphragm, (e) a first additional iris diaphragm at the upper end of the second cylindrical chamber, (f) at least a third cylindrical chamber connected to the second cylindrical chamber at the other side of the first additional iris diaphragm, (g) a second additional iris diaphragm at the upper end of the third cylindrical chamber, (h) adjusting mechanisms for the iris diaphragms for adjusting each iris diaphragm independent of the other iris diaphragms, (i) the walls of the chambers being constructed of solid and at least in part of transparent material, (j) the iris diaphragms being held airtight to adjacent chambers so that the air flowing into the chambers flows out between the inner rim of the diaphragms and the foil tubing.

2. A device as defined in claim 1 in which the volume of said first chamber is smaller than the volume of each additional chamber.

3. A device as defined in claim 2 in which the volumes of the second and third chambers are about equal.

4. A device as defined in claim 1 in which the volume of the second chamber is approximately half as large as the volume of the at least third chamber.

5. A device according to claim 4, in which a fourth cylindrical chamber is connected to the third chamber, said fourth chamber having a third additional iris diaphragm which has an adjusting mechanism, independent of the other iris diaphragms.

6. A device as defined in claim 5 in which the volume of the third chamber is about twice as great as the volume of the other additional chambers.

7. A device as defined in claim 1, in which the iris diaphragms, located between the chambers, are held airtight between ring flanges and the iris diaphragm closing off the last chamber is retained airtight on a ring flange.

8. A device as defined in claim 7 in which spacer pins extend between the flanges of the chambers, each of said spacer pins being screwed to the flanges.

* * * * *

UNITED STATES PATENT AND TRADEMARK OFFICE
CERTIFICATE OF CORRECTION

PATENT NO. : 4,717,323

DATED : January 5, 1988

INVENTOR(S) : Veit-Holger Karl and Klaus Wurtele

It is certified that error appears in the above-identified patent and that said Letters Patent is hereby corrected as shown below:

Title page:

An assignee should be indicated as follows:
--Alpine Aktiengesellschaft,
 Federal Republic of Germany.--

Signed and Sealed this

Tenth Day of January, 1989

Attest:

DONALD J. QUIGG

*Attesting Officer*

*Commissioner of Patents and Trademarks*